July 17, 1951        G. P. KNUDSEN        2,560,769
TRACTOR-TRAILER SAFETY LOCK AND BRAKE MECHANISM
Filed Oct. 28, 1946        3 Sheets-Sheet 1

INVENTOR
George P. Knudsen
BY Robert Cobb
ATTORNEYS

July 17, 1951  G. P. KNUDSEN  2,560,769
TRACTOR-TRAILER SAFETY LOCK AND BRAKE MECHANISM
Filed Oct. 28, 1946  3 Sheets-Sheet 3

INVENTOR
George P. Knudsen
BY
Robert Robb
ATTORNEYS

Patented July 17, 1951

2,560,769

UNITED STATES PATENT OFFICE 2,560,769

TRACTOR-TRAILER SAFETY LOCK AND BRAKE MECHANISM

George P. Knudsen, Edgerton, Wis., assignor to Highway Trailer Company, Edgerton, Wis., a corporation Application October 28, 1946, Serial No. 706,258

6 Claims. (Cl. 280—33.05)

This invention pertains to the art of tractor-trailer vehicles and involves primarily the provision of a novel safety and actuating unit comprising an auxiliary locking member or pin carried by the trailer section of the vehicle and cooperating with the lower fifth wheel commonly mounted upon the rear of the tractor section of the vehicle.

As is well known, the front portion of a trailer vehicle is commonly provided with a wheel or roller support for supporting the said end when the trailer is detached from the tractor. The said support is ordinarily movable from its supporting position, in which its wheels engage the ground, to an upraised position, in which the wheels are spaced from the ground for travel of the combined tractor and trailer vehicle. In other words, the support is rendered inoperative to perform its supporting function when the tractor is hitched to the vehicle and travel is next in order.

In tractor-trailer vehicle combinations such as set forth, it has been found that sometimes the coupling devices on the tractor fifth wheel are inadvertently uncoupled before the adjustable trailer support is positioned to engage the ground to perform its supporting function. Under such conditions, an accidental dropping of the front end of the trailer occurs and much damage may be created.

My present invention therefore relates to an improved device of a type such as heretofore proposed, in which the king pin of the fifth wheel member on the trailer is equipped with a locking or safety pin that engages the lower section of the fifth wheel on the tractor when the support for the front end of the trailer is in its upward adjustable and inoperative position, the safety or lock pin thus performing an auxiliary locking function preventing separation of the tractor and trailer so long as the vehicle sections are in travel condition. In this type of safety connection, movement of the support for the front end of the trailer down to earth engaging position operates the safety or lock pin to disengage the same from the lower fifth wheel section of the tractor, and it is only when said support is so adjusted that the safety connection is interrupted, this being allowable because the support is ready then to carry or support the front end of the trailer and there is no danger of dropping of the latter when the coupling devices between the fifth wheel members are disconnected. Types of construction similar to that above described and relative to which the present invention comprises an improvement are disclosed in Allen Patent No. 1,937,214 of November 28, 1933 and Reid Patent No. 2,232,187 of February 18, 1941, and my primary purpose in the development of the design of safety or lock connection of this invention has been to simplify the mechanical instrumentalities by which movement of the adjustable support for the front end of the trailer may be utilized to actuate the safety or lock pin, as well as to operate brake means for the rear or travel wheels of the trailer at the time the safety or lock pin is shifted to its release position.

With the foregoing in view, a full understanding of my simplified and improved construction will be had upon reference to the following detail description of parts and the accompanying drawings, in which:

Figure 1 is a side view of a trailer equipped with a support for the front end portion thereof, operable to ground engaging position preliminary to uncoupling the trailer from the tractor and adapted to operate the auxiliary safety or lock pin previously referred to.

Figure 1:
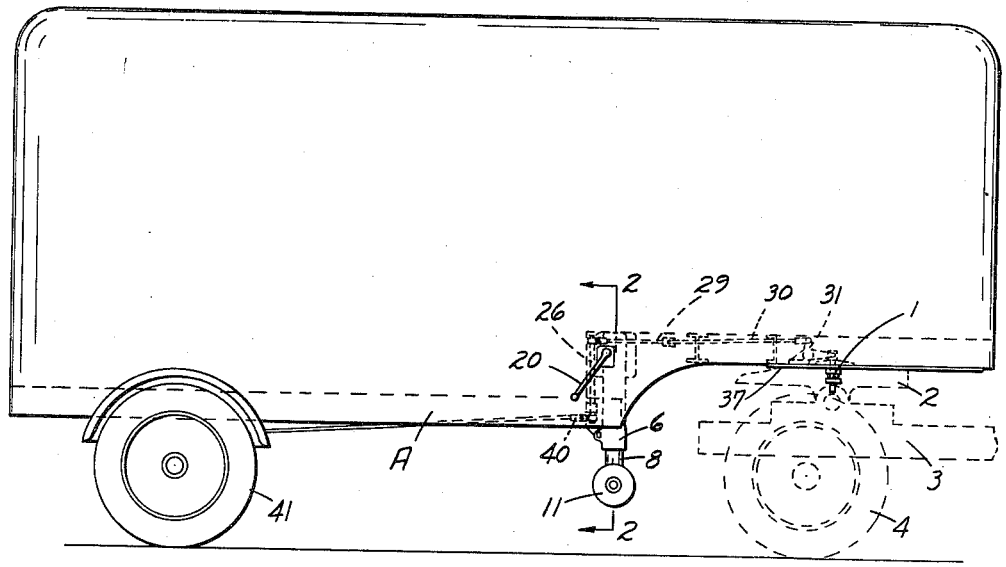

First referring to Figure 1 of the drawings, it will be noted that a conventional trailer vehicle A is shown in full lines with its front king pin 1 in normal connected relation or travel position, respecting the lower rocking fifth wheel member 2 carried by the rear end of the chassis 3 above the rear wheels 4 of said chassis, which is the chassis of the tractor vehicle. The parts 2, 3, and 4 are illustrated in dotted lines, and are conventional. The fifth wheel member 2 will be equipped with the customary coupling latch means to connect said fifth wheel member with the king pin 1 of the trailer, said latch means being required ordinarily to be manually operated when it is desired to disconnect the trailer from the tractor as when the trailer is to be unloaded, enabling the tractor to drive off and pick up another trailer.

Figure 2:
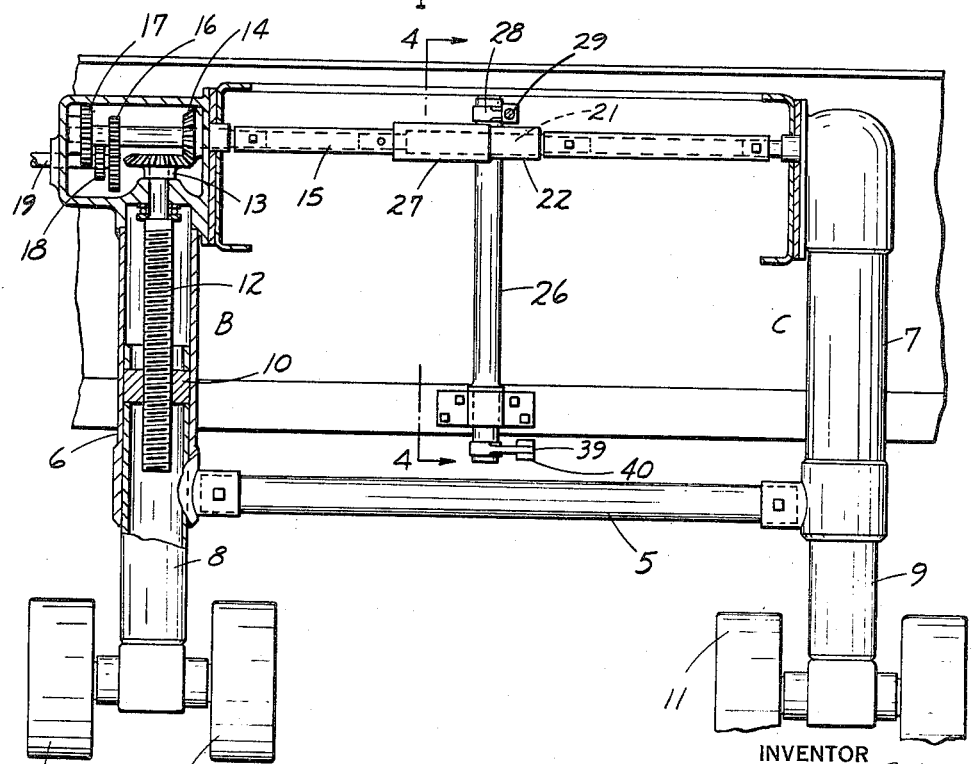
Figure 2 is a vertical sectional view showing more particularly the construction of the trailer front end support, adjustable wheel supporting members, and the safety pin and brake actuating parts associated with the hand crank operated shaft that is utilized to raise and lower the wheel support members of the supporting unit; the section is on the line 2—2 of Figure 1.

In Figures 1 and 2 I have shown the adjustable support for supporting the front end of the trailer in elevated position when it is connected to the tractor and the fifth wheel member 2 of the latter. This support in its general construction is similar to supports heretofore proposed in the art to the extent that it comprises spaced leg members generally designated at B and C, said leg members being connected by a lower horizontal tie bar 5, the ends of which are attached to the upper sections 6 and 7 of the members B and C, respectively. The member B comprises the upper section 6 and the lower section 8, while the member C comprises the upper section 7 and the lower section 9, these sections telescoping one within the other, there being attached inwardly of and near the upper end of each lower section a fixed nut member 10, see Figure 2. The lower members 8 and 9 telescope in the upper sections 6 and 7, respectively, and each of the members 8 and 9 is equipped at its lower end with the ground engaging wheels 11. Within each of the members 6 and 7 is operatively disposed a jack screw 12 having threaded connection with the nut 10 thereof and provided at its upper end with a fixed actuating bevel pinion 13 operated by a bevel pinion 14 carried by the horizontal actuating shaft 15 which is mounted in suitable bearings in frame members of the chassis of the trailer A. In Figure 2 the leg member B is shown in section to illustrate these parts, while the member C is shown in elevation but contains the same general arrangement of such parts.

On one end of the shaft 15 and said shaft is equipped with different diameter gears 16 and 17 selectively engageable by an actuating gear 18, the last gear operable by a crank shaft 19 and handle crank 20 so that the shaft 15 may be rotated at two selective speeds. This feature is not material to the invention since the crank handle 20 may be directly connected to the shaft 15 to operate the shaft, if desired.

It will be apparent that by turning operation of the crank 20 the screws 12 may be rotated to simultaneously move the nuts 10 upwardly or downwardly, upwardly to raise the lower sections 8 and 9 of the legs B and C, and downwardly to move the wheels 11 into supporting engagement with the ground.

The general structure of the adjustable support thus far described as including the sectional leg members B and C and means for moving the lower sections thereof, is largely known in the art, and I do not wish to be limited necessarily to the specific construction of this support so long as there is utilized for its operation a horizontal main actuating shaft such as the shaft 15. Other specific structures of the members B and C could be employed, and the prior art discloses a diversity of such structures susceptible of use in conjunction with my invention.

Figure 3:
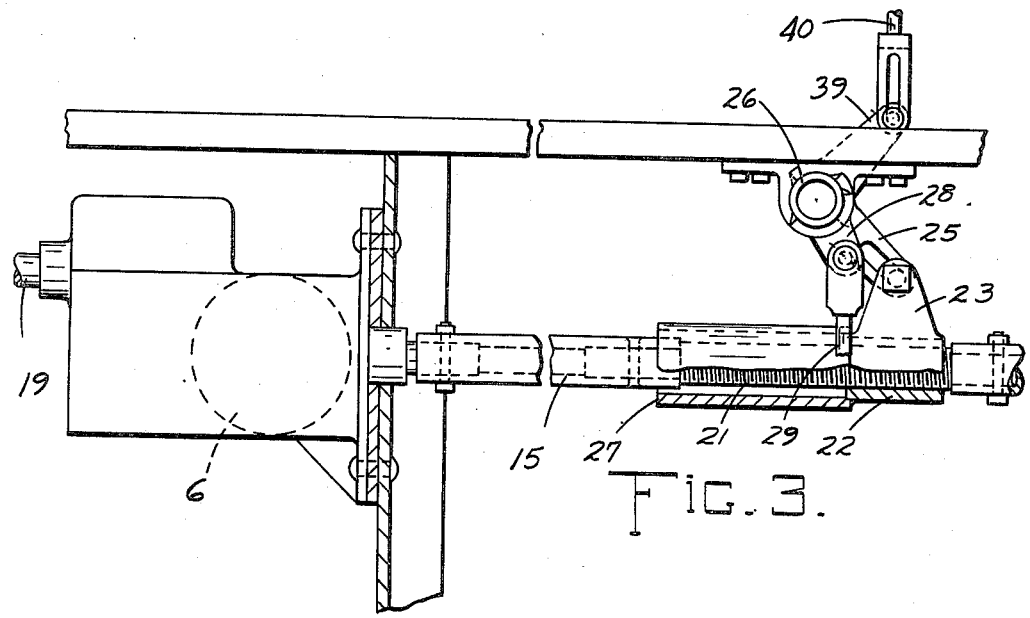
Figure 3 is a fragmentary sectional view, somewhat enlarged compared with other illustrations, bringing out clearly the arrangement of the actuating member or nut on the threaded section of the crank operated shaft for the wheel support, which nut is connected for actuation of the safety pin and/or brake mechanism.
Figure 4:
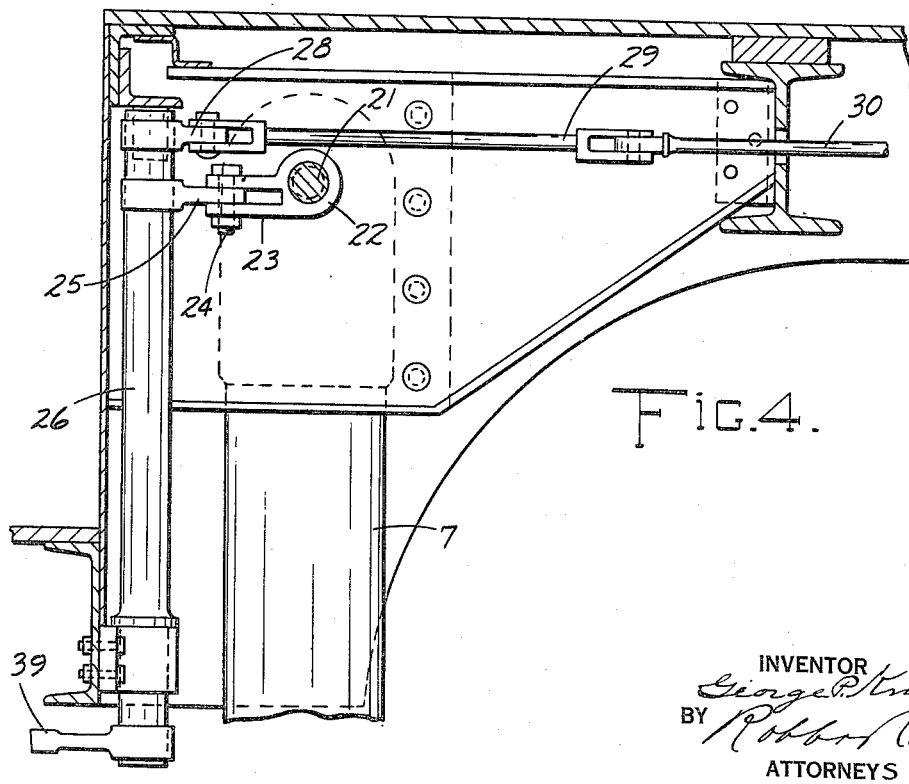
Figure 4 is a sectional view, fragmentary in nature, showing primarily certain parts shown in Figure 2, the section being taken approximately on the line 4—4 of Figure 2 looking in the direction of the arrows.

My invention involves largely the provision on the actuating shaft 15 of a threaded section seen best in Figures 2 and 3 and designated 21. This threaded section receives thereon a sliding nut and arm member 22 having a yoke arm 23 extending laterally therefrom, the nut member 22 being internally threaded to match the threads and move longitudinally on the section 21 by screw action. At its free or outer end the yoke arm 23 is pivotally connected at 24 to an upper slotted arm 25 extending horizontally from the vertical operating shaft 26 mounted in suitable bearings in the framework of the trailer. Thus it will be seen that upon the rotation of the shaft 15 the nut member 22 with its part 23 will be caused to move in one direction or another by the threaded screw engagement of the screw section 21 with the nut member, and incident to such movement the arm 25, rigid on the shaft 26, will rock the shaft with partial rotary movement. The shaft 15 being mounted beneath the trailer and liable to be splattered with mud or foreign matter during the travel movement of the latter, it is contemplated that the threaded section 21 thereof shall be guarded against lodgment thereon of such foreign matter by means of an extended length sleeve 27 that is affixed to the nut 22 at one end thereof.

The shaft 26 is equipped at its upper end with an arm 28 connected with a rod section 29, which in turn is connected with another rod section 30 in alignment therewith, and the latter is attached to the vertical arm 31 on a short horizontal shaft 32, said shaft 32 carrying a safety pin operating arm 33 having pin and slot connection at 34 with the upper end of the safety lock pin 35 which is mounted to slide vertically in and through the king pin 36 adjacent the upper fifth wheel 37 at the front end of the trailer A.

The king pin 36 is the usual king pin previously referred to as adapted to engage the upper fifth wheel 2 of the tractor and to be latched to said fifth wheel by the usual coupling latches such as shown, for instance, in the Martin and Farr Patent No. 1,412,025, issued April 4, 1922. The safety lock pin 35 is designed to engage in a keeper recess on the lower fifth wheel to lock the trailer to the lower fifth wheel 2 independently of the latching or locking connection established by the latching means customarily provided on the fifth wheel. Thus there is a double locking mechanism between the fifth wheel and the trailer, the regular manually operable latching mechanism and the locking pin 35 that is operable from the support unit comprising the parts B and C and associated parts.

Figure 5:
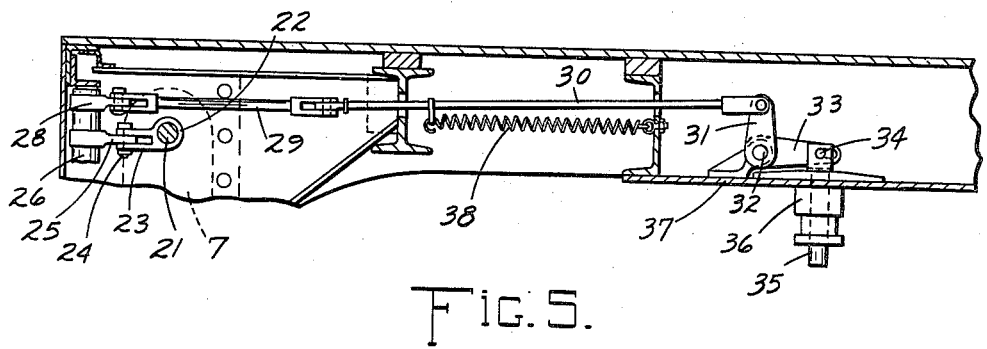
Figure 5 is a longitudinal vertical sectional view through a portion of the frame of the trailer and illustrating the connections intermediate the vertical operating shaft and safety or lock pin; also showing the actuating nut member by which the said vertical shaft is operated.
Figure 6:
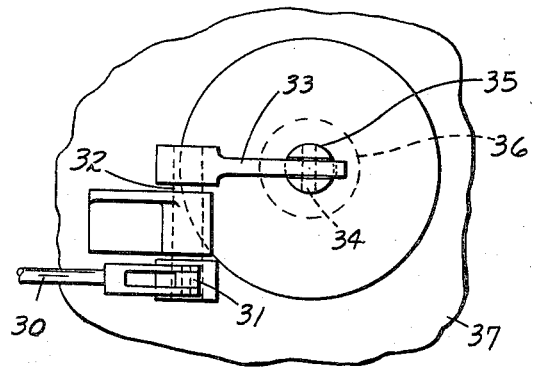
Figure 6 is a fragmentary plan view of direct actuating parts connected to the safety or lock pin of the upper fifth wheel king pin.
Figure 7:
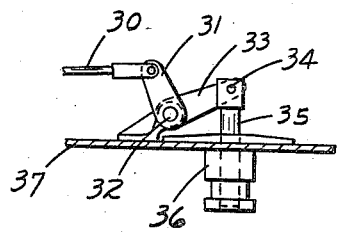
Figure 7 is a detail view in elevation, broken away, illustrating primarily the parts of Figure 6.

A coil spring 38, see Figure 5, normally tends to pull on the rod section 30 to push the safety lock pin 35 into locking engagement with the fifth wheel 2.

Near its lower end the shaft 26 has another actuating arm 39. This arm is connected by a rod 40, see Figure 3, to the brakes associated with the rear wheels 41 of the trailer, by means not shown but conventional in the art, so that at a predetermined time in the rotation of the shaft 15 the said brakes will be set to hold the rear wheels 41 against rotation.

With the foregoing constructional features in mind, it will be apparent that the operation of the safety lock pin 35 and the brake means 40 involves simple movement of the nut member 32 from one extreme of its position in relation to the threaded section 21 of the shaft 15 to the other extreme of its movement.

It will thus be seen that with the parts as fixed in Figure 3 the nut member 22 is in its position for moving the safety lock pin 35 into locking engagement with the lower fifth wheel 2, in which position the pin projects downwardly a short distance from the lower end of the king pin 36. In the position of the parts just referred to, as viewed in Figure 3, the brake rod 40 has been actuated to release the brakes on the wheels 41. The position of the parts referred to is that assumed thereby when the tractor is traveling with the trailer hitched thereto. Let us suppose that the trailer has been pulled to its destination and the uncoupling of the tractor is to be effected. Ordinarily the driver of the tractor will operate the crank handle 20 and turn the shaft so that the nut 22 will be moved from the position shown in Figure 3 leftward to the limit of its movement along the threaded section 21. As the said nut reaches practically the end of the threaded section, and only at such time, it will have rocked the shaft 26 sufficiently to exert a pull on the rod sections 29 and 30 to lift the safety pin 35 out of engagement with the lower fifth wheel 2. This action must take place practically at the end of the turning movement of the shaft 15 by which rotation is imparted to the screw jack members 12 in the legs B and C of the supporting unit so that the lower sections 8 and 9 of the said legs will be adjusted to carry the wheels 11 into engagement with the ground surface before the release of the pin 35 can be completed. Under these conditions of course the support is ready to carry the load of the front end of the trailer and there is no liability of dropping of the latter at such time. If, for some reason under travel conditions, the coupling latches between the lower fifth wheel 2 of the tractor and the king pin 36 should be accidentally disengaged, there would be no liability of separation of the tractor and trailer by reason of the action of the locking pin 35. If, when the driver of the tractor-trailer reaches the destination at which the trailer is to be unloaded, he should inadvertently drive the tractor forward thinking that he has already dropped or lowered the trailer supporting unit to bring the wheels 11 to the ground, the safety pin 35 will prevent disconnection of the tractor from the trailer and liability of accidental dropping of the front end of the latter, whereupon the driver, finding this condition to exist, will get out of the vehicle and perform the necessary operation of lowering the supporting wheels 11 for accomplishing both the release of the lock pin 35 and application of brakes to the wheels 41.

Sufficient play is allowed between the parts 23, 25, 29, 30, and 31 such that the release action of the lock pin 35 will not take place except under the conditions stated, namely, when the nut 22 reaches its leftward limit of movement on the threaded section 21 of the shaft 15.

Having thus described my invention, what I claim as new and desire to secure by Letters Patent of the United States is:

1. In a trailer vehicle, in combination, a trailer body, main travel wheels therefor, a king pin at the front end of the body for connection with a tractor fifth wheel, a safety lock pin mounted on said king pin to engage a tractor fifth wheel, an auxiliary support for the front end of the trailer when disconnected from a tractor including ground engaging members comprising relatively vertically slidable upper and lower parts, means for operating said support to move the lower parts of the ground engaging members toward and from the ground, including an operating shaft transversely mounted upon the trailer body, the said ground engaging members being located adjacent to the ends of the shaft, gearing between the ends of the said shaft and the ground engaging members, an actuating member slidable on said shaft operably connected to the said lock pin for moving the same up and down, and means interconnecting said actuating member and the shaft to cause sliding of the actuating member on the shaft on rotating the latter, whereby movement is transmitted fom the actuating member to the safety lock pin.

2. The combination claimed in claim 1, wherein the actuating member comprises a nut and the operating shaft is equipped with a threaded section for operating said nut for transmitting movement to the nut in opposite directions for actuation of the safety lock pin to cause locking and release movements of the lock pin.

3. In a trailer vehicle, in combination, a trailer body, main travel wheels therefor, a king pin at the front end of the body for connection with a tractor fifth wheel, a safety lock pin mounted on said king pin to engage a tractor fifth wheel, an auxiliary support for the front end of the trailer when disconnected from a tractor, including ground engaging members each composed of vertically telescoping upper and lower parts, means for operating said support to move the ground engaging members toward and from the ground, including an operating shaft mounted transversely on the trailer body and connections between the ends of the shaft and the ground engaging members, said connections directly attached to the lower parts of the ground engaging members to raise and lower same, said shaft having intermediate its ends a threaded section rotative therewith, and a member engaging said threaded section operatively connected with the safety lock pin for moving the latter relatively to the king pin, in one direction on rotation of the shaft in one direction, and in a reverse direction on rotation of the shaft in an opposite direction.

4. In a trailer vehicle, in combination, a trailer body, main travel wheels therefor, a king pin at the front end of the body for connection with a tractor fifth wheel, a safety lock pin mounted on said king pin to engage a tractor fifth wheel, an auxiliary support for the front end of the trailer when disconnected from a tractor, including ground engaging members, means for operating said support to move the ground engaging members toward and from the ground, including an operating shaft mounted on the trailer body and connections between the ends of the shaft and the ground engaging members, driving connections between the ends of the shaft and said engaging members operable to engage and disengage the members relative to the ground, said shaft having a threaded section rotative therewith, a member slidably engaging said threaded section to be moved reversely by the rotation of the shaft and operatively connected with the king pin, and brake operating means connected for actuation by the last mentioned member.

5. The combination claimed in claim 1, wherein the actuating member comprises a nut and the operating shaft is equipped with a threaded section for operating said nut for transmitting movement to the nut for actuation of the safety lock pin, the nut being of a dimension shorter than the threaded section aforesaid, and a guard member extending from the nut to house the threaded section against lodgment thereon of foreign matter when the nut is adjusted for the travel movement of the trailer.

6. In a trailer vehicle, in combination, a trailer body, main travel wheels therefor, a king pin at the front end of the body for connection with a tractor fifth wheel, an auxiliary support for the front end of the trailer when disconnected from a tractor, including ground engaging members comprising upper and lower parts, the lower parts movable toward and from the ground, means for operating said support to move the lower parts of the ground engaging members toward and from the ground, including an operating shaft mounted transversely upon the trailer body, gearing between the ends of the said shaft and the ground engaging members, brake means for the trailer, an actuating member slidable on said shaft, a rotative connection between the actuating member and shaft to cause the sliding of the actuating member along the shaft, and means connecting the actuating member to the brake means for operating the latter incident to sliding movement of the actuating member on the shaft, said gearing comprising gears on the shaft ends, screws on the body connected to the lower parts of the ground engaging members, and gears on the screws meshing with the gears on the shaft ends.

GEORGE P. KNUDSEN.

REFERENCES CITED

The following references are of record in the file of this patent:

UNITED STATES PATENTS

| Number | Name | Date |
| --- | --- | --- |
| 1,937,214 | Allen | Nov. 28, 1933 |
| 2,043,342 | Walker | June 9, 1936 |